Patented Jan. 5, 1937

2,066,512

UNITED STATES PATENT OFFICE 2,066,512

ALLOY

Robert S. Archer, Evanston, Ill., assignor to A. O. Smith Corporation, Milwaukee, Wis., a corporation of New York No Drawing. Application October 17, 1934, Serial No. 748,693

7 Claims. (Cl. 75—153)

This invention relates to an alloy, specifically, to an alloy suitable for use as electrode material.

An object of the invention is to provide an improved welding electrode material.

Another object is to provide a method of forming and heat treating articles made from the alloy.

Another object is to provide an alloy suitable for use as a contact wheel or electrode for welding equipment.

A further object is to produce an improved copper-iron-phosphorus alloy.

Another object is to provide an alloy of high electrical conductivity having a long useful service life and of a hardness sufficient to withstand pressure when used as an electrode for resistance welding such as spot or seam welding of lapped sheets of metal.

Further objects will be apparent as the disclosure proceeds.

The alloy of my invention is much harder than copper yet has a conductivity approaching that of this metal and it can be cheaply produced in a form which is free from many limitations and disadvantages of other electrode alloy materials heretofore used.

The alloy is a ternary alloy of copper, iron, and phosphorus and the invention contemplates making the alloys by two methods, (1) Melting the ingredients together; and (2) Sintering together powdered copper and a powdered alloy of iron and phosphorus.

The first method has been found to be satisfactory for the preparation of alloys containing up to approximately five per cent of iron. Some difficulty has been experienced in the preparation of uniform ingots of higher iron alloys by this method due to a tendency for segregation to occur. Difficulties caused by segregation can be avoided by the use of the second method of preparing the alloy.

To obtain the highest electrical conductivity, it is desirable to have approximately two atoms of iron for each atom of phosphorus. This corresponds to a weight percentage of iron which is 3.6 times the weight percentage of phosphorus. While it appears that the highest values of electrical conductivity are obtained for this ratio of iron to phosphorus, iron in excess of this amount causes only a relatively small decrease in conductivity, and has a desirable effect upon the mechanical properties of the alloy in that it causes the hardness to be retained better when the alloy is heated.

The alloy accordingly is composed of copper with iron and phosphorus, the percentage of iron being in excess of three times the percentage of phosphorus, and preferably in excess of three and one-half times the percentage of phosphorus. Alloys having up to 5% of iron will then have a maximum of $\frac{1}{3} \times 5\%$ or 1.67% phosphorus.

The alloy may be prepared by melting the copper, preferably in a graphite crucible under a layer of charcoal to prevent oxidation, and adding the required amount of phosphorus in the form of a copper-phosphorus alloy. The desired amount of iron may be added as metallic iron. The molten alloy is held at a temperature just above its melting point for approximately fifteen minutes and stirred to produce thorough mixing of the ingredients and to facilitate the escape of gases. The alloy is then cast, preferably in chill ingot molds.

Alternatively, the iron and phosphorus may be added to the molten copper in the form of an iron-phosphorus alloy. If this alloy contains a different proportion of iron and phosphorus than is desired in the copper base alloy, additional iron may be added as metallic iron, or additional phosphorus in the form of a copper-phosphorus alloy. In case an iron-phosphorus alloy is added to molten copper, it is desirable that the temperature of the copper be raised to approximately 1200° C. before the addition is made. The high temperature promotes the solution of the iron-phosphorus alloy which is not as readily soluble in molten copper as alloys of copper and phosphorus. The temperature can then be dropped to slightly above the melting point of the alloy, and the alloy is held at this temperature for some fifteen minutes before pouring.

The ingots are subjected to further treatment to bring the alloy into the desired form, to improve its electrical conductivity, and to give it a greater hardness than it has in the cast condition. A suitable treatment consists of hot rolling or forging the ingots, annealing, and cold working the annealed material.

The hot forging or rolling should preferably, give a reduction in cross section of at least fifty percent.

The annealing temperature and the time of anneal will depend upon the conductivity that is desired in the finished product. With a high annealing temperature, the alloy reaches its equilibrium conductivity in a relatively short time. However, the equilibrium conductivity obtained by annealing at a high temperature is lower than can be secured by annealing at a lower temperature for a correspondingly longer period of time.

The following results were obtained for an alloy containing 0.516% P. and 1.82% Fe. After hot forging, the conductivity was 49.7%. This alloy has a percentage of iron which is 3.53 times the percentage of phosphorus. This ratio of iron to phosphorus corresponds to 1.96, or very nearly two atoms of iron to each atom of phosphorus.

By annealing the alloy at 600° C. for two to three hours, the conductivity was raised to approximately 60%. By annealing at 500° C. for 32 hours, the conductivity was raised to approximately 79%. By annealing at 450° C. for 50 hours, the conductivity was raised to 84%. In some cases, as with severely worked materials, such as wire, it may be desirable to carry out the annealing at 400° C. or below. Consequently, the temperature and time of anneal can be so chosen as to produce the desired conductivity in the least time.

After annealing, the alloy is quenched or air cooled to room temperature and is cold rolled or cold worked to give a reduction in cross section of approximately fifty percent. The cold rolling or working reduces the electrical conductivity of the annealed material by a few percent.

The hot rolling and annealing appear to cause no particularly important changes in the hardness of the alloy. The hardness is increased by the cold rolling to approximately 110 Brinell for an alloy with 0.516% P., and 1.82% Fe. After heating for one hour at temperatures of 300° C., 350° C. and 400° C., specimens of this material were found to have hardnesses of 100, 96 and 72.5 Brinell, respectively.

A contact wheel for a stitch welding machine was made from an alloy containing 2.45% Fe. and 0.45% P., a ratio of iron to phosphorus which corresponds to approximately three iron atoms to each phosphorus atom. The alloy was cast into a plate 1½" thick by 8" square and the hot top was rejected. The plate was hot rolled to a thickness of ⅞", annealed at 500° C. for 24 hours, and cold rolled to a thickness of $\frac{7}{16}$". The hardness was 66.8 Brinell after hot rolling, 69.1 after annealing, and 100 after cold rolling. The conductivity was 65%.

The wheel made from the copper-iron-phosphorus alloy was put into service on a stitch welding machine used in welding barrels and operated satisfactorily.

The behavior of the copper-iron-phosphorus alloys indicates the presence of one or more constituents, probably phosphides of iron, of variable solubility in the solid alloy. Heat treatments may therefore be employed to take advantage of solution and precipitation effects.

While I have indicated various percentages of copper, iron and phosphorus as they initially appear as the constituent elements of the alloy, I do not wish to be bound by the exact percentages given.

It is understood that the alloy described and claimed herein may contain small quantities of other ingredients or impurities such as do not materially affect its characteristics.

Having described my invention, what I claim as new and desire to secure by Letters Patent, is:

1. An alloy consisting of iron 1.82%, phosphorus .516% and the remainder copper.

2. An alloy consisting of iron 2.45%, phosphorus .45% and the remainder copper.

3. An alloy composed of phosphorus up to 1.67%, iron up to 5% and the balance copper, the phosphorus and iron constituting essential ingredients of said alloy and each being present in at least useful amounts.

4. An electric current-carrying member composed of phosphorus up to 1.67%, iron up to 5% and the balance copper, the phosphorus and iron constituting essential ingredients of said alloy and each being present in at least useful amounts.

5. A welding electrode composed of phosphorus up to 1.67%, iron up to 5% and the balance copper, the phosphorus and iron constituting essential ingredients of said alloy and each being present in at least useful amounts.

6. An alloy composed of phosphorus up to 1.67%, iron up to 5% and the balance copper, the phosphorus and iron constituting essential ingredients of said alloy and each being present in at least useful amounts, the weight percentage of iron being in excess of 3 times the weight percentage of phosphorus.

7. An electric current-carrying member composed of phosphorus up to 1.67%, iron up to 5% and the balance copper, the phosphorus and iron constituting essential ingredients of said alloy and each being present in at least useful amounts, the weight percentage of iron being about 3.6 times the weight percentage of phosphorus.

ROBERT S. ARCHER.